3,252,869
FUEL ELEMENT
Stanley L. Koutz, San Diego, Calif., assignor to General Dynamics Corporation, New York, N.Y., a corporation of Delaware
Filed Feb. 12, 1963, Ser. No. 257,989
9 Claims. (Cl. 176—68)

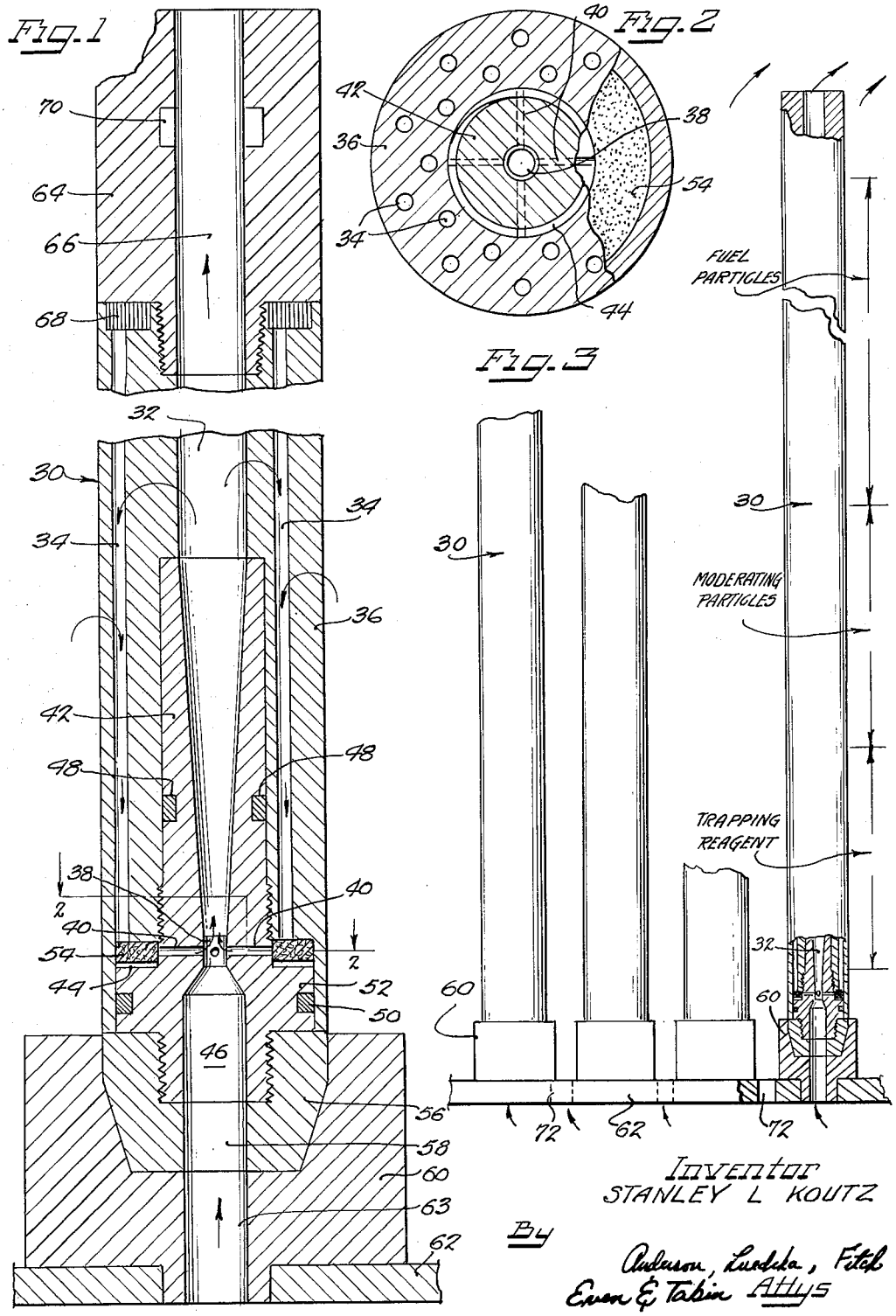

This invention relates to fuel elements for use in nuclear reactors and more particularly to an improved fuel element for use in a high temperature gas cooled nuclear reactor.

The removal of fission products from the interior of high temperature gas cooled nuclear reactors and from the fuel chambers of the fuel elements is necessary to prevent plating out of condensible fission products upon the reactor. Fission products are generally removed from the reactor by allowing a portion of the coolant gas to pass over the fissionable fuel within the fuel element. The gas scavenges the fission products migrating from the fuel and sweeps them out of the fuel element at a controlled flow rate into a suitable fission products trap where they are removed from the coolant gas which can then be recycled to the system.

It is known to provide fuel elements with a series of interior passageways through which coolant gas is caused to pass to scavenge the fission products from the fuel. It is also known to incorporate internal trapping agents within fuel elements through which the coolant gas passes after picking up the fission products and the trapping agent removing a great majority of the condensible fission products. The coolant gas is then passed through an external trap to remove the remaining fission products and reduce the amount of radioactive material to the desired level.

Prior devices for accomplishing the internal trapping of fission products, referred to as forced purge systems, have required elaborate piping and fluid handling systems and a complicated header to direct the coolant gas into the interior of the fuel element and to remove the gases passing through the fuel element from the reactor, and have, therefore, been expensive to construct.

It is a principal object of the present invention to provide a self-purging fuel element for use in nuclear reactors. It is another object of the invention to provide a self-purging fuel element which employs a reduced pressure within the fuel chambers to effect purging of fission products therefrom. A further object is the provision of a fuel element which is inexpensive to construct and intall in a reactor.

Yet another object is to provide an improved fuel for use in a nuclear reactor.

These and other objects of the invention are more particularly set forth in the following detailed description and in the accompanying drawings of which:

FIGURE 1 is a partial fragmentary vertical cross-sectional view of a fuel element showing various features of the present invention.

FIGURE 2 is a cross-sectional view taken along line 2—2 of FIGURE 1; and

FIGURE 3 is an elevation partly in section, showing a plurality of the fuel elements shown in FIGURE 1 supported in the core of a reactor.

In general, the fuel element shown in the drawings comprises an elongated pervious fuel element 30 having a bore 32 extending therethrough. At least one fuel containing chamber 34 is provided in the body portion 36 of the fuel element 30. A restriction 38 is provided in the bore 32 which is connected to the fuel chamber 34 by a passageway 40 so that a reduced pressure occurs within the fuel chamber 34 when a coolant gas is caused to pass through the bore 32. The reduced pressure within the fuel chamber 34 causes coolant gas to pass through the pervious body portion 36 of the fuel element 30 into the fuel chamber 34 where the coolant gas scavenges the fission products from the fuel. The gas then passes through an internally contained fission trapping re-agent disposed in the fuel chamber 34 which removes most of the condensible fission products. The coolant gas then returns to the bore 32 of element 30 at the restriction 38, thus providing a self-purging fuel element.

Referring now to the drawings in detail, there is shown in FIGURE 1 a fuel element 30 which includes an elongated, generally cylindrical, body or central portion 36 having a central bore 32 therein. For purposes of explanation, the fuel element is described hereinafter as it is orientated in a reactor core. The body portion 36 is constructed of a moderating material which can withstand the operating conditions of a reactor core and which is of a permeability sufficient to permit a coolant gas, such as helium, to readily pass therethrough, but low enough to retain the majority of the fission products with the body portion 36. The body portion 36 of the illustrated embodiment is preferably constructed from graphite having a permeability to helium within a range of from $10^{-2}$ to $10^{-3}$ cm.$^2$ per second.

In addition to having a helium permeability within the range of $10^{-2}$ to $10^{-3}$ cm.$^2$ per second, the graphite employed in the fuel element preferably has a pore structure that is resistant to the back diffusion of the fission products. Back diffusion of fission products is the diffusion of fission products through the graphite fuel element in a direction opposite to the flow of helium into the interior of the fuel element. It is believed that this preferred pore structure occurs in graphite which has an abundance of relatively large pores and a lesser number of relatively small pores, as opposed to graphite having a predominance of medium or small sized pores. The large pores allow for a greater coolant gas velocity through the graphite piece which, it is believed, prevents the back diffusion of the fission products through the graphite fuel element. Graphite available from different vendors, and having the same helium permeability, has been found to have widely varying pore structures, thus helium permeability alone is not a sufficient criterion upon which the desirability of a particular graphite for use as a fuel element can be based. There is no method presently known for specifying the pore structure of the graphite, and generally each piece is individually tested by attempting to back diffuse krypton through the fuel element to determine whether its pore structure will prevent the back diffusion of fission products.

The graphite body portion 36 can be constructed by any suitable means, i.e., by machining or by extrusion, but the symmetrical shape of the preferred embodiment lends itself to the extrusion operation.

A plurality of longitudinally extending, spaced-apart, generally cylindrical chambers or passageways 34 are provided in the body portion 36. The centers of the chambers 34 are disposed on two concentric circles. Each chamber 34 contains a fissionable fuel, a moderating agent and a trapping reagent disposed in three zones.

Although any number of conventional fissionable fuels may be employed within the chambers 34 of the fuel element 30, the fuel element is particularly suited for use with a nuclear fuel comprising a packed bed of discrete particulate fissionable fuel. The particulate fuel employed in the packed bed may comprise discrete particles of either coated or uncoated fissionable material, such as uranium dicarbide and thorium dicarbide. If coated fuel particles are desired, the particulate fissionable fuel may be formed with a single layer fission products retaining coating comprising, for example, pyrolytic carbon, silicon carbide or zirconium carbide. Additionally, the fuel particles may be formed having a multiple layer fission products retaining coating comprising, for example, an inner coating of pyrolytic carbon, an intermediate coating of a metallic carbide, such as zirconium carbide or silicon carbide, and an outer coating of pyrolytic carbon.

A packed bed of fissionable fuel is preferable when compared to conventional compacted and sintered fuels, since it removes the necessity of fabricating and/or machining the fuel compact and also because the graphite fuel element in which the fuel is contained or housed can be made with lesser tolerances. The discrete fuel particles are also easier to handle in that they can be poured into the fuel chambers within the element rather than having to be carefully inserted into the element as do the existing types of compacted fuels.

The fissionable fuel particles, e.g., uranium dicarbide and/or thorium dicarbide, are coated with pyrolytic carbon in order to reduce their reactivity with the atmosphere during any time in which they might be stored prior to being used and during the time in which they are being handled when they are disposed within the fuel chambers in the fuel element. The pyrolytic carbon coating also acts to retard the release of fission product gases from the fuel particles during the operation of the reactor.

The packed bed of discrete fissionable fuel may be employed with other types of purged fuel elements. Also, the fuel element of the present invention may employ a mixture of carbon coated uranium and thorium dicarbide particles dispersed in a graphite matrix. The carbide fuel particles are coated with a pyrolytic carbon coating.

Directly below the fuel particles is a layer of graphite particles which acts as a moderator for the layer of fuel and below the graphite moderator layer is a layer of a suitable trapping reagent for the fission products scavenged from the fuel particles by the coolant purge gas, which passes through the chamber. The trapping reagent within the chamber is used to remove the condensible fission products from the purge gas. The remaining fission products i.e., the noble gases, not removed by the internal trapping reagent are delivered to the primary coolant system as hereinafter described, and are subsequently removed from the primary coolant system by external trapping systems.

A metal coated charcoal, such as silver coated charcoal, has been found to be a suitable trapping reagent, the metal coated charcoal removing all fission products except the aforementioned noble gases which are delivered to the primary coolant system.

In the illustrated embodiment, the lower end of the bore 32 is enlarged by suitable machining techniques to allow for the insertion within the lower end of the body portion 36 of a correspondingly shaped, generally cylindrical, elongated plug 42 having a bore 46. The bore 46 contains a venturi, i.e., a restriction formed from two truncated cones connected at their small ends by a short cylinder called the venturi throat 38, or other suitable means for reducing pressure within the bore 46. For purposes of explanation, the plug 42 containing a restriction within its bore will be referred to as a venturi plug.

As can be seen in FIGURE 1, the venturi plug 42 is formed with an enlarged cylindrical lower end portion 52 which cooperates with a counterbore at the lower end of body portion 36. The counterbore is of a diameter such that all of the chambers 34 are exposed and communicate with one another via an annular recess 44 formed on the upper surface of the lower end portion 52. An annular filter ring or filter means 54 is disposed in the recess 44. Any suitable filter, such as a porous carbon ring, can be employed. The venturi plug 42 contains a plurality of small passageways 40 communicating between the annular chamber 44 and the throat 38 of the bore 46, which bore communicates at its upper end with the lower end of the bore in the body portion. Suitable seals 48 and 50 of a material such as silicon or zirconium braze, are provided between the body portion and the venturi plug, both above and below the recess.

The venturi plug 42 is connected to a generally cylindrical end piece 56 by suitable means, i.e., a downwardly threaded projection and a correspondingly threaded recess in the upper surface of the end piece. The end piece is composed of a material such as graphite, which can withstand the operating conditions encountered in the reactor. The end piece is provided with a vertically extending central bore 58 which communicates with bore 46. End piece 56 is beveled and is received in a corresponding recess in a cylindrical cup 60 for mounting in a grid plate 62 within the reactor (not shown). In this connection, the cup is provided with a downwardly extending projection which is received in an aperture in the grid plate 62. The venturi plug 42 is constructed from any suitable material that will withstand the operating conditions of the reactor, graphite having been found to be such a suitable material. The plug 42 is connected to the body portion 36 by any suitable means, such as a threaded intermediate portion thereof, which is received in a correspondingly threaded portion in the body portion 36.

A vertically extending bore 63 is provided in the cup 60 which bore communicates with the bore 58 in the end piece 52.

An upper cylindrical end piece 64 having a vertically extending bore 66 is suitably connected to the upper end of the body portion 36. In this connection, the upper end piece is provided with downwardly extending threaded projection which is received in an internally threaded recess in the upper end of the body portion. The upper end piece is made of a material, such as graphite, which can withstand the operating conditions of the reactor. The upper end piece 64 is sealed to the body portion 36 adjacent its outer surface by an annular seal 68 which rests in an annular groove in the body portion 36. An annular recess 70 is formed in bore 66 to provide a suitable surface which may be engaged by a grasping means (not shown) for removing the fuel element from the reactor core.

In operation, the fuel elements are mounted in the hollow cups contained on the perforated grid plate substantially as shown by FIGURE 3 or are retained in place by any other suitable means such as a hollow pipe threadably connected to the grid plate. Suitable spacing rings (not shown) are provided on each of the fuel elements to maintain the fuel elements in proper alignment with the reactor. A suitable coolant gas, e.g., helium, is caused to pass upwardly through the grid plate, a main portion of the gas passing through apertures in the grid plate and around the exterior of the individual fuel elements. A minor portion of the gases pass upwardly through the interior of each of the fuel elements. It has been found that satisfactory conditions result when approximately ⅓ of the total flow of the coolant gas passes through the interior of the fuel elements.

That portion of the coolant gas passing through the interior of each element is caused to pass through the throat of the venturi or other restriction in the bore of the element resulting in a pressure drop across the restriction and a lower static pressure at the point of greatest restriction.

The lower pressure adjacent the throat of the venturi results in a lower pressure in the fuel chambers since the fuel chambers are in communication with the venturi throat via the annular chamber and passageways in the venturi plug.

The coolant gas flow induced in the fuel chamber acts to scavenge fission products from the fuel maintained in the upper portion of the fuel element. The gas flows downwardly from the fuel containing portion of each of the fuel chambers through the graphite moderating particles and trapping reagent into the annular chamber communicating with all the fuel chambers in each element, from whence it passes through the passageways in the venturi plug into the stream of coolant gas flowing through the interior of the fuel element.

The gaseous activity in the primary coolant system can be controlled by any suitable external trap. It has been found that it is not necessary to remove all of the fission products not removed by the trapping reagents from the primary coolant. A safe operating level can be achieved by bypassing only a portion of the primary coolant through the external trap, 5 percent per hour of the total coolant volume through the external trap being a sufficient amount to reduce the activity of the coolant gas to an acceptable level.

In one embodiment, fuel elements for use in a 500 megawatt gas cooled reactor, are made by extruding an annular shaped body portion having 24 evenly spaced fuel chambers in the wall thereof to a length of 18 feet 6 inches. Each fuel element is made of a graphite having a helium permeability of $10^{-2}$ cm.$^2$ per second and a pore structure which resists the back diffusion of fission products, and has a total length of 20 feet, an outside diameter of 4½ inches and a bore of 1½ inches. A restriction of ⅜ inch in diameter is provided in the bore.

Carbon coated uranium and thorium dicarbide particles dispersed in a graphite matrix are disposed in the upper 15½ feet of the fuel chamber. Equal amounts of a graphite moderator and a layer of trapping re-agent are added to fill the remaining portions of the fuel chamber.

Three thousand fuel elements are disposed in the reactor core, and in operation of the reactor, helium coolant gas is passed into the reactor at a total flow rate of $4.5 \times 10^6$ pounds per hour of which $3 \times 10^6$ pounds per hour flow on the exterior of the fuel elements and $1.5 \times 10^6$ pounds per hour flows through the interior of the fuel elements. The restrictions within the bores of the fuel elements create a pressure differential of 15 p.s.i. between the fuel chambers and the coolant stream. This pressure differential induces a purge flow rate of 1 pound per hour per element, or a total of 3,000 pounds per hour through the fuel chambers of the elements. The purge flow rate of 3,000 pounds per hour is sufficient to prevent substantially all of the fission products which escape from the fuel particles from leaking through the walls into the main coolant stream. A pressure drop of 3 to 4 p.s.i. occurs in the stream in passing through the fuel element.

An external fission products trap is provided for the coolant to remove krypton and xenon and to keep the total radioactive level at the desired amount. The external trap handles 5 percent of the total coolant flow rate per hour.

It can be seen that an improved fuel element has been provided which allows fission products to be purged from the interior of a fuel element in a more efficient manner and without the necessity of employing elaborate manifolds, headers, and piping arrangements within the reactor grid plates for the transmittal of the gaseous coolant around and through the fuel element. In addition, there has been provided an improved fuel element which eliminates the necessity of providing for an extensive external fission product trapping system and the necessary fluid handling means within the reactor shell and substitutes therefor, a fission products trap and method of purging within the fuel element itself and an external bypass trapping system. The improved fuel element, as described, results in a lowered construction cost and eliminates the possibility of backflow from the internal trap should depressurization occur.

There has also been provided a nuclear fuel of discrete fissionable fuel particles which are adapted to be disposed in a packed bed within a fuel element.

It is to be noted that the use of a venturi to form a pressure drop within the fuel element is considered a matter of convenience only and any other means suitable for causing a pressure differential, i.e., an orifice plate, baffle, restricted passage, etc., is considered to be within the scope of the invention.

While various specific embodiments of the invention have been particularly defined in order to explain the invention, it is intended that the scope of the invention be limited only by the appended claims.

What is claimed is:

1. A self-purging element for a nuclear reactor comprising, a coolant gas pervious graphite body having a bore extending therethrough, a plurality of spaced apart chambers adapted to receive reactive fuel in the wall thereof and extending throughout the length of said body, a hollow graphite plug connected to one end of said body, said plug cooperating with said bore and forming a venturi therein, such that the pressure of a coolant gas passing through said body is reduced adjacent said plug, said plug having communicating passageways between said chambers and said venturi, whereby the pressure in said chambers is reduced relative to the exterior and interior of said body inducing coolant gas flow into said chambers through the pervious walls of said body.

2. A self-purging element for a nuclear reactor comprising, an elongated graphite body having a helium permeability of from $10^{-2}$ to $10^{-3}$ cm.$^2$ per second and a graphite pore structure which resists back diffusion of fission products, a bore extending therethrough, a plurality of spaced apart chambers adapted to receive reactive fuel extending throughout the length of said body, a hollow graphite plug connected to one end of said body, said plug cooperating with said bore and forming a venturi therein such that the pressure of a coolant gas passing through said bore is reduced adjacent said plug, said plug having communicating passageways between said chambers and said venturi whereby the pressure in said chambers will be reduced relative to the exterior and interior of said body inducing coolant flow into said chambers through the walls of said body.

3. A self-purging fuel element for a nuclear reactor comprising, an elongated graphite body having a helium permeability of from $10^{-2}$ to $10^{-3}$ cm.$^2$ per second and a graphite pore structure which resists back diffusion of fission products, a bore extending therethrough, a plurality of spaced chambers in the wall of said body, said chambers adapted to receive a fissionable fuel, a moderating material and a fission product trapping agent, a graphite venturi plug connected to one end of said body establishing a zone of reduced pressure within one end of said body when a coolant gas is passed therethrough, means carried by said plug to seal said chambers from the interior and exterior of said body, said plug having a plurality of passageways communicating between said chambers and the interior of said plug adjacent the zone of reduced pressure, filter means disposed between said chambers and said passageways, means carried by said plug for mounting said element in a reactor grid plate, and means adjacent the other end of said element for sealing said chambers and means for removing said element from the reactor.

4. A self-purging fuel element for a nuclear reactor comprising, an elongated graphite body having a helium permeability of from $10^{-2}$ to $10^{-3}$ cm.$^2$ per second and a graphite pore structure which resists back diffusion of fission products, and having a bore extending therethrough, a plurality of spaced chambers in the wall of said body, said chambers adapted to receive a fissionable fuel, a moderating material and a fission product trapping agent, a graphite venturi plug connected to one end of said body establishing a zone of reduced pressure within one end of said body when a coolant gas is passed therethrough, means carried by said plug to seal said chambers from the interior and exterior of said element, an annular passage defined by said plug and said element communicating between said fuel chambers, said plug having a plurality of passageways communicating between said annular chamber and the interior of said plug adjacent the venturi, means carried by said plug for mounting said element in a reactor grid plate, means adjacent the other end of said element for sealing said chambers, and means for removing said element from the reactor.

5. A fuel element for use in a nuclear reactor comprising, an elongated body having a bore extending therethrough, said bore having a venturi formed therewithin, a packed bed of discrete fuel particles disposed in a chamber within said body, said fuel comprising particles of a fissionable material having a fission products retaining coating thereon, means carried by said body for introducing a coolant gas into said chamber, and means in said body connecting said chamber in fluid connection with said bore adjacent said venturi, whereby said coolant gas will pass through said chamber, over said fuel and into said bore thus scavenging fission products from said body.

6. A self-purging element for a nuclear reactor comprising, an elongated body having a bore extending therethrough, a hollow graphite plug connected to one end of said body, said plug cooperating with said bore and forming a venturi therein, a packed bed of discrete fuel particles disposed in a chamber within said body, said chamber communicating with the interior of said plug adjacent said venturi, said fuel comprising particles of a fissionable material having a fission products retaining coating thereon, said body having a permeability such that a coolant gas will diffuse through said body, over said fuel and into said bore, thus removing fission products from said body.

7. A self-purging element for a nuclear reactor comprising, an elongated graphite body having a helium permeability of from $10^{-2}$ to $10^{-3}$ cm.$^2$ per second and a graphite pore structure which resists back diffusion of fission products and having a bore extending therethrough, a plurality of spaced apart chambers extending throughout the length of said body, a fuel comprising discrete particles of a fissionable material having a fission products retaining coating thereon disposed in said chambers, means carried by said bore forming a restriction therein such that the pressure of a coolant gas passing through said bore is reduced adjacent said means, communicating passageways between said chambers and said means whereby the pressure in said chambers will be reduced relative to the exterior and interior of said body inducing coolant flow through the walls of said body into said chambers and through said fuel.

8. A self-purging element for a gas-cooled nuclear reactor comprising a body having a bore extending therethrough and a fuel chamber formed within said body, fissionable nuclear fuel material disposed in said fuel chamber, means carried by said body forming a restriction in said bore such that the pressure of a coolant gas passing through said bore is reduced adjacent said means, means for introducing a coolant gas into said chamber, and a communicating passageway between said chamber and said restriction-forming means whereby the pressure in said chamber is reduced relative to the exterior of said body inducing coolant flow into said chamber, past said fuel material, and out of said body through said communicating passageway.

9. A self-purging element for a gas-cooled nuclear reactor comprising a coolant gas pervious graphite body having a bore extending therethrough, said pervious graphite having a helium permeability from about $10^{-2}$ to $10^{-3}$ cm.$^2$ per second and a graphite pore structure which resists back diffusion of fission products, said body also having formed therewithin a chamber adapted to receive nuclear fuel and extending throughout the major portion of the length of said body, nuclear fuel material disposed within said chamber, means carried by said body forming a venturi in said bore to reduce the pressure of the coolant gas passing through said bore thereat, and a communicating passageway between said chamber and said venturi means whereby the pressure in said chamber is reduced relative to the overall pressure of the coolant gas stream inducing coolant gas flow into said chamber through said pervious graphite body and out of said body through said communicating passageway.

References Cited by the Examiner

UNITED STATES PATENTS

| 2,799,642 | 7/1957 | Hurwitz et al. | 176—71 |
| 2,968,601 | 1/1961 | Evans et al. | 176—73 |
| 3,010,889 | 11/1961 | Fortescue et al. | 176—19 |
| 3,039,947 | 6/1962 | Fortescue et al. | 176—71 |
| 3,135,665 | 6/1964 | Koutz et al. | 176—71 |

FOREIGN PATENTS

| 809,586 | 2/1959 | Great Britain. |
| 845,804 | 8/1960 | Great Britain. |
| 878,927 | 10/1961 | Great Britain. |

OTHER REFERENCES

Nuclear Metallurgy, vol. VI, Nov. 4, 1959, pp. 87 and 91–94.

REUBEN EPSTEIN, *Primary Examiner.*

CARL D. QUARFORTH, *Examiner.*

R. W. MacDONALD, R. L. GRUDZIECKI,
*Assistant Examiners.*